Aug. 23, 1932. C. ORTEGA 1,873,144
COOKING PLANT FOR CAFETERIAS
Filed Feb. 18, 1930 4 Sheets-Sheet 1

Inventor
Carlos Ortega
By Mason Fenwick & Lawrence
Attorneys

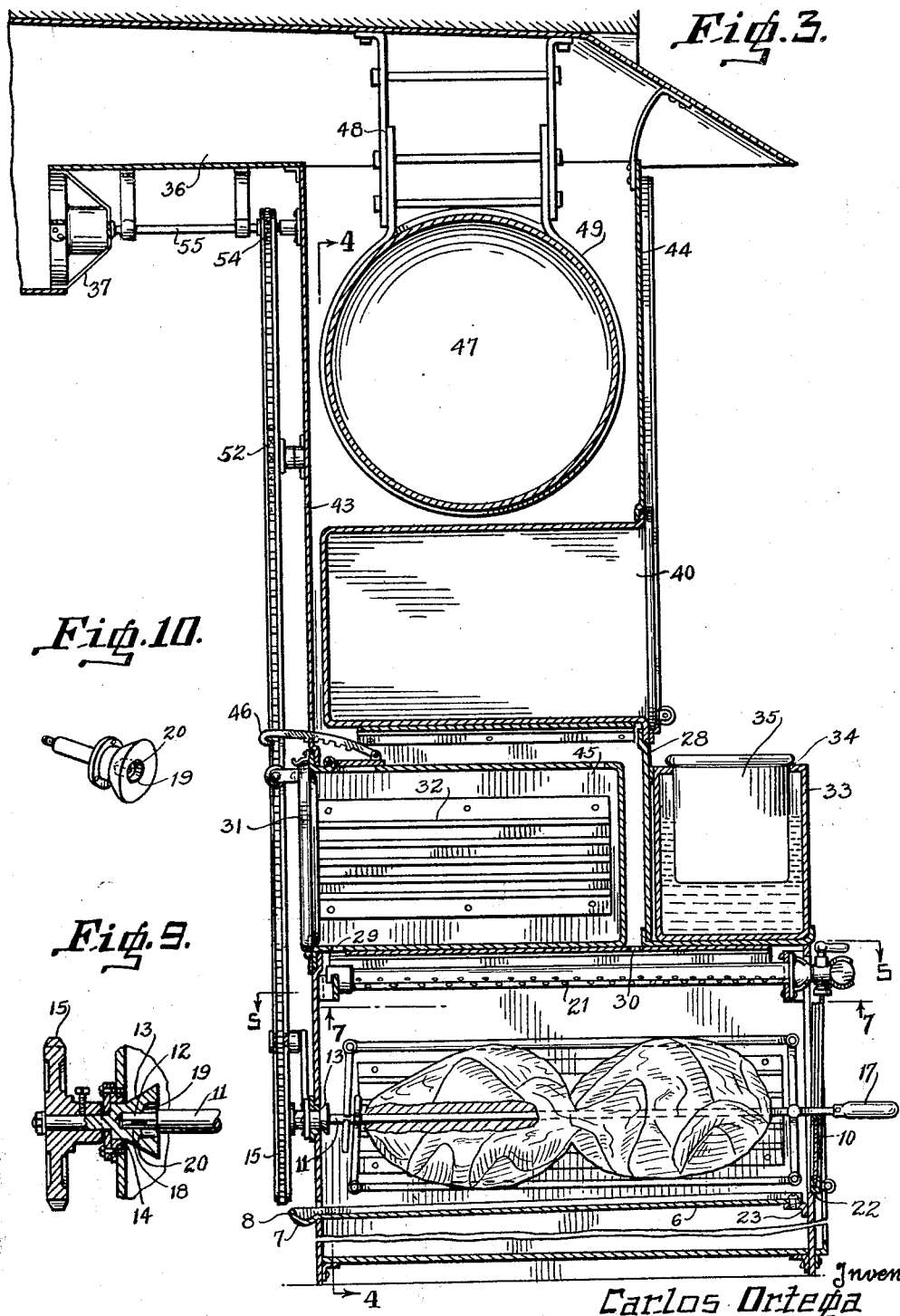

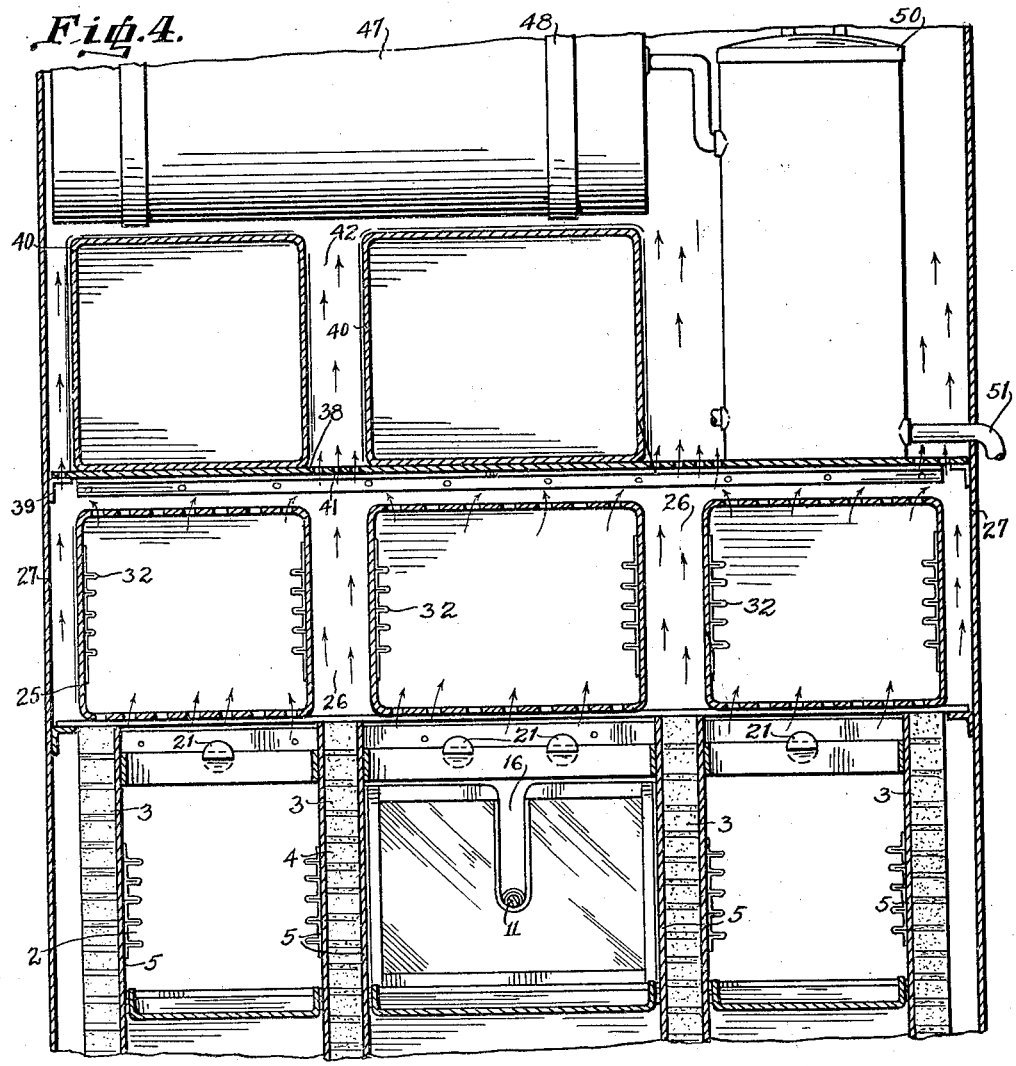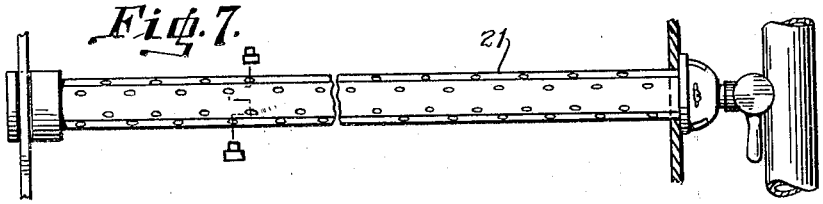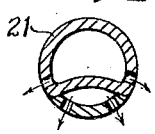

Aug. 23, 1932.  C. ORTEGA  1,873,144

COOKING PLANT FOR CAFETERIAS

Filed Feb. 18, 1930  4 Sheets-Sheet 4

Inventor
Carlos Ortega
By Mason Fenwick & Lawrence
Attorneys

Patented Aug. 23, 1932

1,873,144

UNITED STATES PATENT OFFICE

CARLOS ORTEGA, OF NEW YORK, N. Y.

COOKING PLANT FOR CAFETERIA

Application filed February 18, 1930. Serial No. 429,358.

This invention relates to cooking plants for cafeterias, and particularly to that type of cooking plant designed to be located in the partition between the dining room and kitchen, having such appurtenances on the dining room side as will facilitate serving, while the power means for operating certain devices such as the spits and ventilators are on the opposite side, out of the view of the patrons of the dining room.

One of the objects of the invention is the provision of a construction in which the cooking compartments are tiered up, that is, the roasting compartment or a plurality of such compartments, to which the source of heat is directly supplied, is at the bottom, while the baking and warming ovens and a chamber surrounding a tank of water are arranged in superposed relation to the roasting compartment, and indirectly heated by the convection flow of heated air and combustion products from the roasting compartment, which passes around said ovens and through said chamber.

Another object of the invention is the construction of the cooking plant in knocked-down units which can be readily set up on the job.

Still another object of the invention is the independent suspension of the water tank, relieving the intermediate compartments of the weight of the water, so that said compartments may be made of light construction if desired, without fear of sagging or structural failure.

A further object of the invention relates to the novel spit and door combination associated with the roasting ovens.

Other objects of the invention will appear as the following description of a preferred and exemplary embodiment thereof proceeds.

In the drawings in which the same characters of reference are used throughout the several figures to denote identical parts:

Figure 3 is a vertical cross-section taken along the line 3—3 of Figure 2;

Figure 4 is a section taken along the line 4—4 of Figure 3;

Figure 7 is a section taken along the line 7—7 of Figure 3;

Figure 8 is a cross-section of one of the burners in the roasting ovens taken along the line 8—8 of Figure 7;

Figure 9 is a section on enlarged scale of socket 13 and adjacent parts seen in Figure 3; and Figure 10 is a perspective view of the rotary spit socket.

Figure 1:
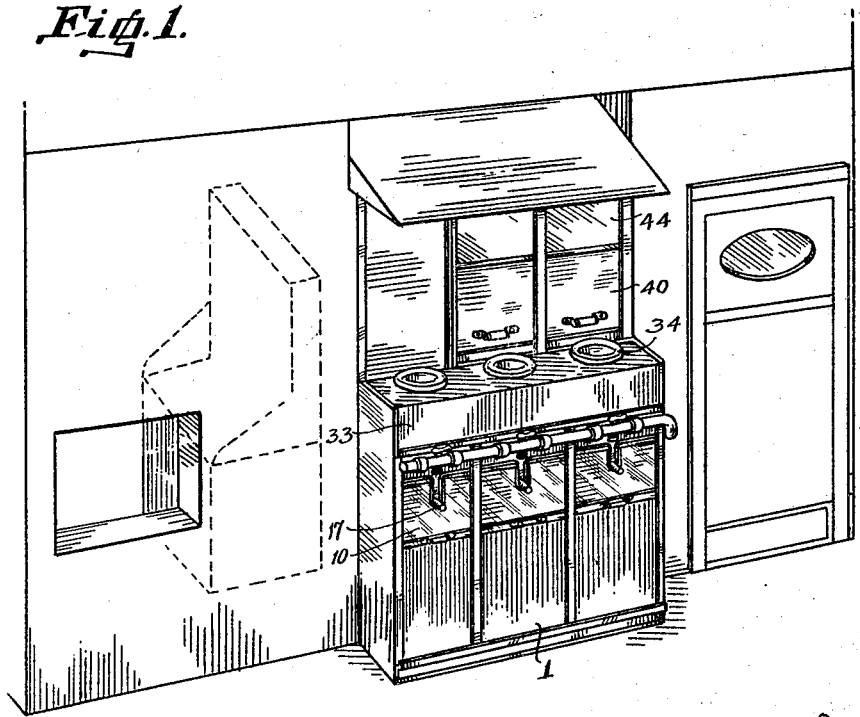
Figure 1 is a perspective view of a cooking plant embracing the principles of the present invention, in its preferred relation to the partition wall of a cafeteria.

Referring now in detail to the several figures, and first adverting to Figures 1 and 3, the numeral 1 represents the base portion of the cooking plant which is not an important feature of the invention, being simply provided so as to place the roasting ovens at a convenient elevation from the floor. Above the base 1 and mounted thereupon are a plurality of roasting ovens 2 arranged side by side. It is within the contemplation of the present invention to provide but a single roasting oven if desired. However, the construction of the plant is best illustrated by several of such ovens.

The roasting ovens are constituted by side walls 3, each consisting of a filling 4 of brick or other insulating material arranged between side plates 5, said side plates being suitably secured in relation to said filling. Since it is contemplated that the cooking plant will be shipped from the factory knocked-down and set up on the job, the side walls of the oven are fabricated as complete structural units before being shipped.

It is immaterial whether or not the side walls of the oven extend through the base 1, although it may be desirable to have them do so for purposes of strength. The roasting ovens are each provided with an iron floor 6 which, preferably, slopes to the rear of the cooking plant in order to drain off meat juices which may drip upon it. The rear end of the oven is provided with apertures 7 at the plane of the floor 6 and the oven is provided with a trough 8, which may be an extension of the floor 6, in which the meat juices may drain or be collected.

The roasting ovens are each closed at the rear by a wall as shown and in front by a sliding door 10. Before describing the door further, it may be stated that a spit 11 extends through the oven, having a polygonal rear end 12 which removably fits into a rotatable socket member 13 journaled in a suitable aperture 14 in the rear wall of the oven and being rotated by means of a sprocket 15 from a remote source of power, as will presently be described.

Figure 6:
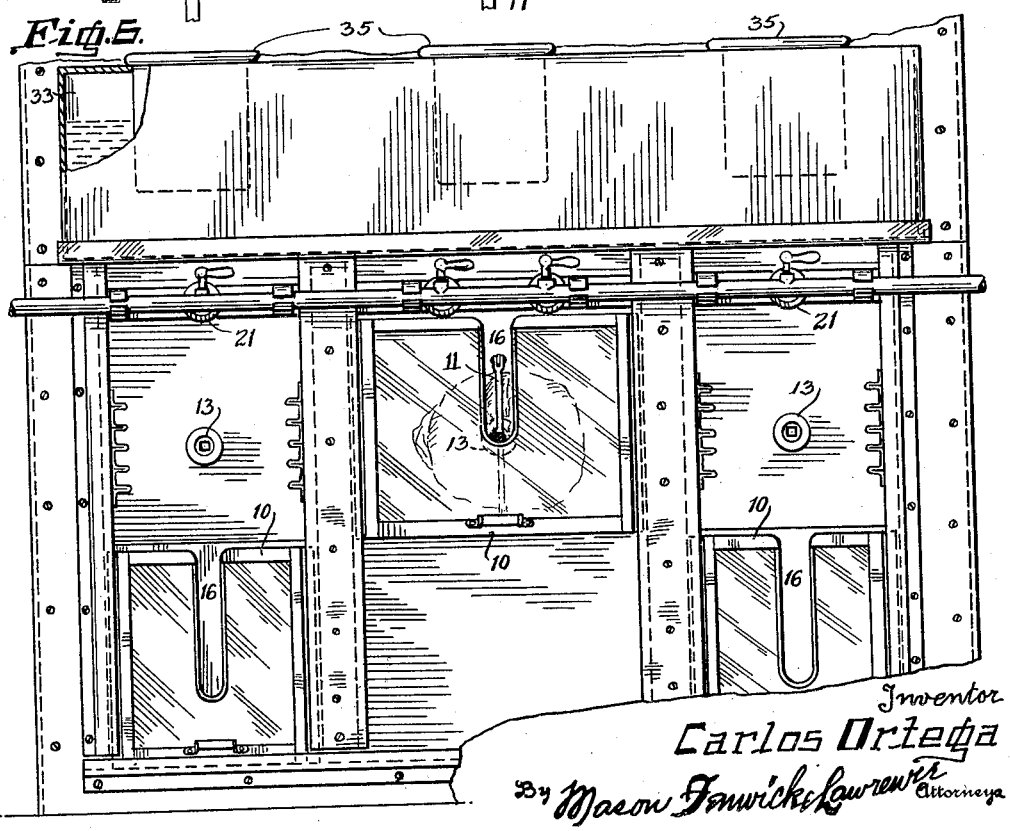
Figure 6 is a front elevation of the lower part of the cooking plant.

The front end of the spit extends through a slot 16 formed in the door, see Figures 4 and 6, said slot terminating at such a height that the door when closed supports the forward end of the spit. The spits are each provided with handles 17 extending beyond the door 10.

The rotatable socket member 13 has a polygonal recess 18 matching the polygonal end of the spit so that when the spit is within said recess the spit itself is driven through the sprocket 15. The socket member 13 is also provided with a cylindrical recess 19 in front of the polygonal recess 18 and merging with the polygonal recess by means of a sloping shoulder 20. The spit may be pulled out of the polygonal recess and let rest in the cylindrical recess so that it will not rotate, but at the same time, it is supported at its rear end by the socket member. By pushing upon the spit it slides over the sloping shoulder into the polygonal recess, and thus becomes rotatably engaged with the socket member.

The spit is, of course, for the purpose of impaling masses of meat, or fowls, which are turned while roasting. Gas burners 21 furnish the heat for the roasting ovens, although it is within the purview of the invention to use electric or other heating agents. The slot 16 in the sliding door 10 permits the progress of the cooking to be viewed without unnecessarily opening the oven door, although the entire door may, if desired, be transparent.

When it is desired to open the oven, for instance to cut a slice from the roasting object, the handle 17 of the spit is grasped and the spit is pulled out sufficiently to release the polygonal end 12 from the polygonal recess 18 so that the polygonal end 12 rests in the cylindrical recess 19 and the spit stops rotating. The door 10 is then slid down and the front end of the spit may be lowered until the roasting object rests upon the floor 6 at which time the slice may be cut.

The door may then be raised to closed position and pushed slightly inward until the lower edge 22 thereof catches on the ledge 23 formed at the front of the oven near the bottom. This holds the door in closed position and the spit is then supported by the door. The spit may then be pushed in, reengaging the polygonal end with the polygonal socket whereupon the spit again begins to rotate.

Above each of the roasting ovens is a baking compartment 25. Said baking compartments are installed as separate units and are placed a distance apart so as to form flues 26. The outer sides of the outer-most ovens and the fronts of the entire series of ovens are provided with spaced walls 27 and 28 forming flues so that said ovens are surrounded by communicating spaces to which the heated air and combustion products from the roasting ovens are admitted by way of rows of holes 30 formed in the top walls of the roasting ovens. Other rows of holes 29 place the roasting ovens in direct communication with the interior of the baking ovens.

The baking ovens are preferably closed at their rear end by sliding doors 31, and their side walls are preferably provided with fins 32 for enhancing the rate of heat exchange between said side walls and the adjacent flues.

In front of the series of baking ovens is a hot water table 33 to which heated water may be supplied from a hot water tank, later to be described and which water is kept hot by heat conduction through the top walls of said roasting ovens, and through the bottom wall of said hot water table. The top of said hot water table is provided with suitable apertures 34 into which are set vessels 35, the lower portions of which are immersed in the hot water. These vessels are to receive such foods as are usually kept heated on steam tables.

The walls 27 preferably continue upward to the top of the cooking plant, joining with certain front and back plates hereafter to be mentioned to form a conduit for the heated air and products of combustion which finally communicates with an exhaust pipe 36 going into a chimney, not shown. A fan blower 37 at the same time ventilates the kitchen, withdrawing the air laden with the odors of the cooking.

Above the baking ovens a partition 38 is arranged, the same being supported by and secured to angle brackets 39. A pair of warming ovens 40 rest on the partition 38 and are heated both by conduction through said partition and by the heated gases which pass through apertures 41 in said partition and through flues 42 formed between said warming ovens and at the side thereof.

It will be noted from Figure 3 that a plate 43 is provided forming the rear wall of the enclosure through which the products of combustion pass on their way to the exhaust pipe 36 and that above the warming oven at the front, said enclosure is completed by means of a plate 44. These plates join in gas tight manner with the side walls 27. The baking oven is provided with a series of apertures 45 permitting the escape of the gases into the flue space which surrounds the warming ovens and a damper 46 is also provided for controlling a still freer escape of said heated gas.

Above the warming oven and within the enclosure formed by the aforementioned plates is the hot water storage tank 47. As shown in Figure 3, this tank is suspended from the ceiling beams or from some other support extraneous to the cooking plant by means such as the bracket 48 and hanger 49.

The warming oven and the plates forming the casing of the enclosure are thus relieved from the stress incident to the weight of the hot water tank and its contents. It is, of course, understood that by the time the heated air and gases reach that part of the enclosure which surrounds the hot water tank, they are not so intensely hot as to be able to heat the water, their function being rather to keep it hot when once heated. For the purpose of heating water, a hot water heater 50 of any improved construction is placed within the enclosure and preferably rests upon the partition 38. Said heater is connected by suitable piping with the hot water reservoir and with the water supply. Said heater includes a burner not shown, supplied by the gas pipe 51.

Figure 2:
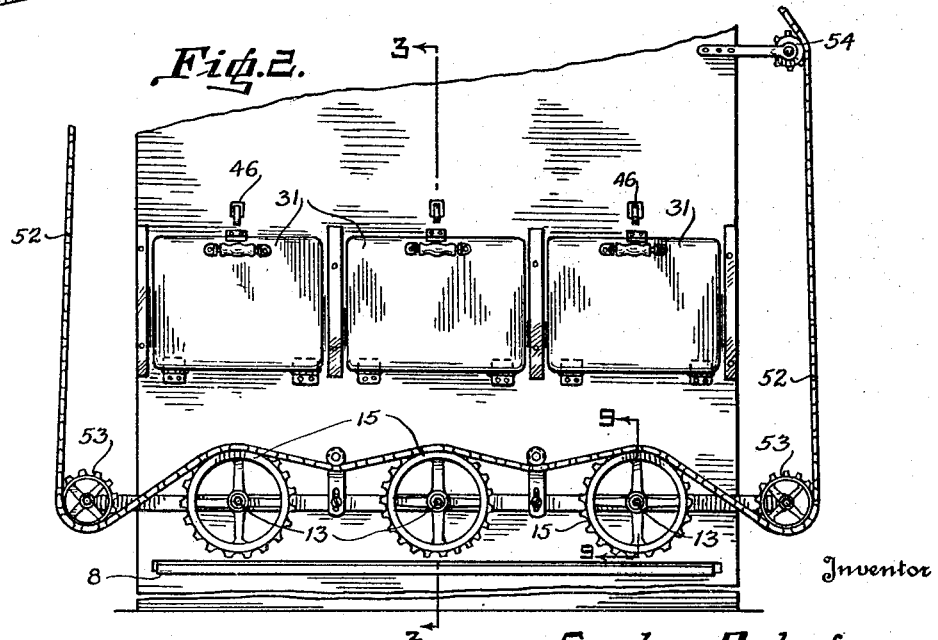
Figure 2 is a rear elevation of the lower part of the cooking plant.
Figure 5:
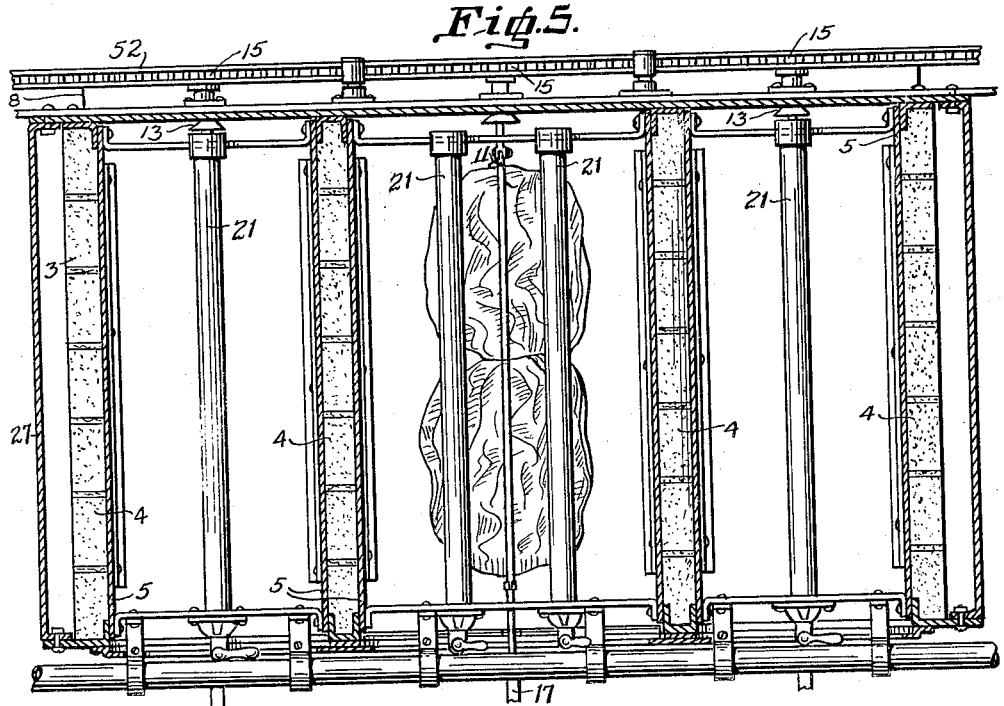
Figure 5 is a section taken along the line 5—5 of Figure 3.

Referring now to Figures 2 and 3, it will be observed that the spits 11, each of which is provided with a sprocket 15, are rotated by a common chain 52 passing over said sprockets and over certain direction changing sprockets 53, shown in Figure 2.

Said chain then ascends to a point adjacent the top of the cooking plant where it passes over a driving sprocket 54 fixed to shaft 55 of motor fan 37.

It thus appears that while the primary application of heat, in the cooking plant of my invention, is for that style of cooking which requires the fiercest heat, the waste heat from this cooking operation is utilized for other forms of cooking successively in the order of the degree of heat required, so that the cooking plant operates with the highest efficiency.

Having now described what I believe to be a preferred and practical form of my invention, it is to be understood that the details of construction as disclosed and described are merely by way of example and not limitative, and that the invention is of a breadth to be determined by a fair interpretation of the scope of the appended claims.

What I claim is:

1. In a cooking apparatus, a roasting oven, a sliding door for said oven, a spit in said oven, means at the rear of said oven for rotating said spit, the forward end of said spit being supported by said door when the latter is closed.

2. In a cooking apparatus, a roasting oven, a sliding door for said oven having a slot, a spit in said oven projecting through said slot, means at the rear of said oven for supporting the rear end of said spit and imparting rotation thereto, the forward end of said spit being supported by said door when the latter is closed.

3. In a cooking apparatus, a roasting oven, a sliding door for said oven having a slot, a spit in said oven projecting through said slot, means at the rear of said oven for removably supporting the rear end of said spit, said means comprising a rotatable socket member having a polygonal recess, the cooperating end of said spit being correspondingly shaped, the forward end of said spit being supported by said door when the latter is closed.

4. In a cooking apparatus, a roasting oven, a sliding door for said oven having a slot, a spit in said oven projecting through said slot, being of polygonal cross section at its rearward end, means at the rear of said oven for removably supporting the rearward end of said spit, said means comprising a rotatable socket member having a recess of polygonal cross section at its rear portion fitting the end of said spit, and being cylindrical at its forward portion for non-rotatably supporting the rear end of said spit when the latter is drawn out of said polygonal portion, the forward end of said spit being supported by said door when the latter is closed.

5. In a cooking apparatus comprising a lower row of roasting ovens having heat insulating walls, burners in said ovens, a superposed row of baking ovens spaced apart, forming between them flues, said flues communicating with said roasting ovens, and an immersion tank for food vessels seated on said roasting ovens in heat conductive relation thereto and in front of said baking ovens.

6. A cooking apparatus comprising a lower row of roasting ovens having heat insulating walls, burners in said ovens, a superposed double tier of ovens, the ovens of one tier being spaced from those of the other forming between them a flue, said flue communicating with said roasting ovens, a receptacle above said tiers of ovens and bridging said flue, and an immersion tank for food vessels seated on said roasting ovens in heat conductive relation thereto and in front of the lower row of ovens in said double tier.

7. A cooking apparatus as claimed in claim 6 including a spit in each of the roasting ovens, means at the rear of each of said ovens for rotatably and removably supporting the rear ends of said spits, sliding doors at the forward end of said ovens having slots through which said spits extend, said doors supporting the forward ends of said spits when said doors are in closed position, sprockets fixed to said rotating supporting means, and a chain engaging said sprockets and a source of power for simultaneously driving said spits.

8. Cooking apparatus comprising a roasting oven having a burner; a baking oven above the roasting oven, shorter than the roasting oven, providing a ledge on top of the roasting oven; a hot water table for food vessels on the ledge; a warming oven above the baking oven; a hot water supply tank above the warming oven; and a casing, providing a structure having many food cooking and serving receptacles in vertical arrangement upon small floor space through which products of combustion shall pass in direct contact with the successive receptacles at progressively lower temperatures.

9. Cooking apparatus adapted to stand between dining room and kitchen, comprising roasting ovens having doors on the dining side; burners associated with the roasting ovens; baking ovens above the roasting ovens having doors on the kitchen side and being shorter than the roasting ovens, providing a ledge on top of the roasting ovens on the dining side; a hot water table for food vessels on the ledge on the dining side; warming ovens above the baking ovens, having doors on the dining side; a hot water supply container above the warming ovens; and a casing, providing a structure having many food cooking and serving receptacles in vertical arrangement upon small floor space.

10. A cooking apparatus comprising a lower row of roasting ovens having heat insulating walls, burners in said ovens, a superposed double tier of ovens, the ovens of one tier being spaced from those of the other, forming between them a flue, said flue communicating with said roasting ovens, an immersion tank for food vessels seated on said roasting ovens in heat conductive relation thereto and in front of the lower row of ovens in said double tier, a water tank above said double tier of ovens, a water heater therefor, and means for enclosing said tank and heater and communicating with said flues, said water tank being supported independently of the rest of the structure of said cooking apparatus.

11. A cooking apparatus comprising a plurality of roasting ovens arranged side by side and having openings in their upper portions, burners in said ovens, a plurality of baking ovens above said roasting ovens and spaced apart, and a receptacle above said baking ovens bridging a pair of them to receive heat from the openings in the roasting ovens through the intervening space.

In testimony whereof, I affix my signature.

CARLOS ORTEGA.